United States Patent [19]

Lemelson

[11] Patent Number: 5,570,087
[45] Date of Patent: Oct. 29, 1996

[54] MOTOR VEHICLE PERFORMANCE MONITOR AND METHOD

[76] Inventor: Jerome H. Lemelson, Suite 286, Unit 802, 930 Tahoe Blvd., Incline Village, Nev. 89451-9436

[21] Appl. No.: 198,621

[22] Filed: Feb. 18, 1994

[51] Int. Cl.$^6$ ........................................ B60Q 1/08
[52] U.S. Cl. ............... 340/870.05; 340/439; 340/539; 340/576; 340/936; 340/993
[58] Field of Search ........................ 340/438, 439, 340/539, 825.15, 825.16, 905, 903, 936, 576, 993, 994; 364/424.03, 424.04, 426.04, 436

[56] References Cited

U.S. PATENT DOCUMENTS

| | | | |
|---|---|---|---|
| 3,680,043 | 7/1972 | Angeloni | 340/936 |
| 4,229,727 | 10/1980 | Gilhooley | 340/441 |
| 4,500,868 | 2/1985 | Tokitsu et al. | 340/439 |
| 4,528,547 | 7/1985 | Rodney | 340/43 P |
| 4,591,823 | 5/1986 | Horvat | 340/905 |
| 4,671,111 | 6/1987 | Lemelson | 340/43 P |
| 5,270,708 | 12/1993 | Kamishima | 340/995 |
| 5,315,295 | 5/1994 | Fujii | 340/936 |
| 5,325,082 | 6/1994 | Rodriquez | 340/43 P |

FOREIGN PATENT DOCUMENTS 0542421  5/1993  European Pat. Off. ............. 340/43 P

*Primary Examiner*—Jeffery Hofsass
*Assistant Examiner*—Daniel J. Wu
*Attorney, Agent, or Firm*—Niro, Scavone, Haller & Niro

[57] ABSTRACT

A system and method are disclosed for monitoring the performance of a motor vehicle. The vehicle's instantaneous accelerations in at least two directions are continually sensed and stored as coded signals in a computer memory. Performance variables of the vehicle are computed from the acceleration signals stored in memory along with associated time and date codes. By means of inertial navigation and/or radio transmissions from global positioning system satellites, the vehicle's global position is also computed and stored. The stored performance variables are analyzed over a period of time in order to evaluate how the vehicle is being driven. When an erratic or otherwise hazardous driving pattern is detected, signals may be generated to warn the driver and/or traffic authorities.

17 Claims, 1 Drawing Sheet

MOTOR VEHICLE PERFORMANCE MONITOR AND METHOD

BACKGROUND AND SUMMARY OF THE INVENTION

The present invention relates to an improved system and method for monitoring the movements and performance of a motor vehicle in order to locate the vehicle and determine the manner in which it is driven. A prior system for monitoring vehicular performance is described in U.S. Pat. No. 4,671,111 issued on Jun. 9, 1987, the entire disclosure of which is hereby incorporated by reference into the present specification.

In accordance with the present invention, performance variables associated with a motor vehicle are monitored by an onboard computer system. Such performance variables include the vehicle's speed, direction, and location. The vehicle's instantaneous accelerations in at least two horizontal directions are continually sensed and stored as coded signals in a computer memory by the onboard system. Performance variables of the vehicle are computed from the acceleration signals and stored in memory along with associated time and date codes. By means of inertial navigation using the accelaration data and/or radio transmissions from global positioning system satellites, the vehicle's global position is also computed and stored. The stored performance variables are analyzed over a period of time in order to evaluate how the vehicle is being driven. An evaluation code is computed which corresponds to an assessment of the current driving pattern. Such an assessment may indicate, for example, whether and how well the vehicle is maintaining a planned course of travel. Erratic driving patterns typically associated with driving under the influence of drugs or alcohol may also be detected. Warnings or other alerting signals to the driver are then generated by the system. The system may also output detailed descriptions of the performance variables and driving pattern either in the form of synthetic speech or a visual display.

The system also incorporates a shortwave radio transmitter/receiver for communicating with a remote monitor station. Performance variables and evaluation codes may be transmitted to the remote monitor station periodically and/or in response to a radioed request received by the onboard system from the remote monitor station. When an erratic or otherwise hazardous driving pattern is detected, signals may be generated to alert traffic authorities as well as informing authorities as to the vehicle's identity and location. Additionally, roadside warning signals along the vehicle's course of travel may be activated.

The system may also include brake and/or acceleration controllers for controlling the speed of the vehicle in response to the detection of a hazardous driving pattern. Activation of the controllers may be done by the onboard system automatically or in response to a radio transmission from a remote monitor station. The controllers may also be used to disable the vehicle in the event the vehicle is stolen, at which time the vehicle's identity and location may be transmitted to the authorities.

It is accordingly a primary object of the present invention to provide a system and method for monitoring the performance of a motor vehicle by an onboard computer system, which performance includes the vehicle's speed, direction, and location.

It is a further object of the invention to evaluate and record the performance of the vehicle over periods of time and generate evaluation codes indicative of certain driving patterns such as hazardous driving or compliance with a planned course of travel.

It is a further object of the invention to warn the driver when a hazardous driving pattern is detected.

It is a further object for the onboard system to communicate via short wave radio with a remote monitor station, transmitting performance data and evaluation codes to the remote station periodically and/or in response to a request from the remote station.

Other objects, features, and advantages of the invention will become evident in light of the following detailed description considered in conjunction with the referenced drawings of a preferred exemplary embodiment according to the present invention.

DETAILED DESCRIPTION OF THE INVENTION

Figure 1:
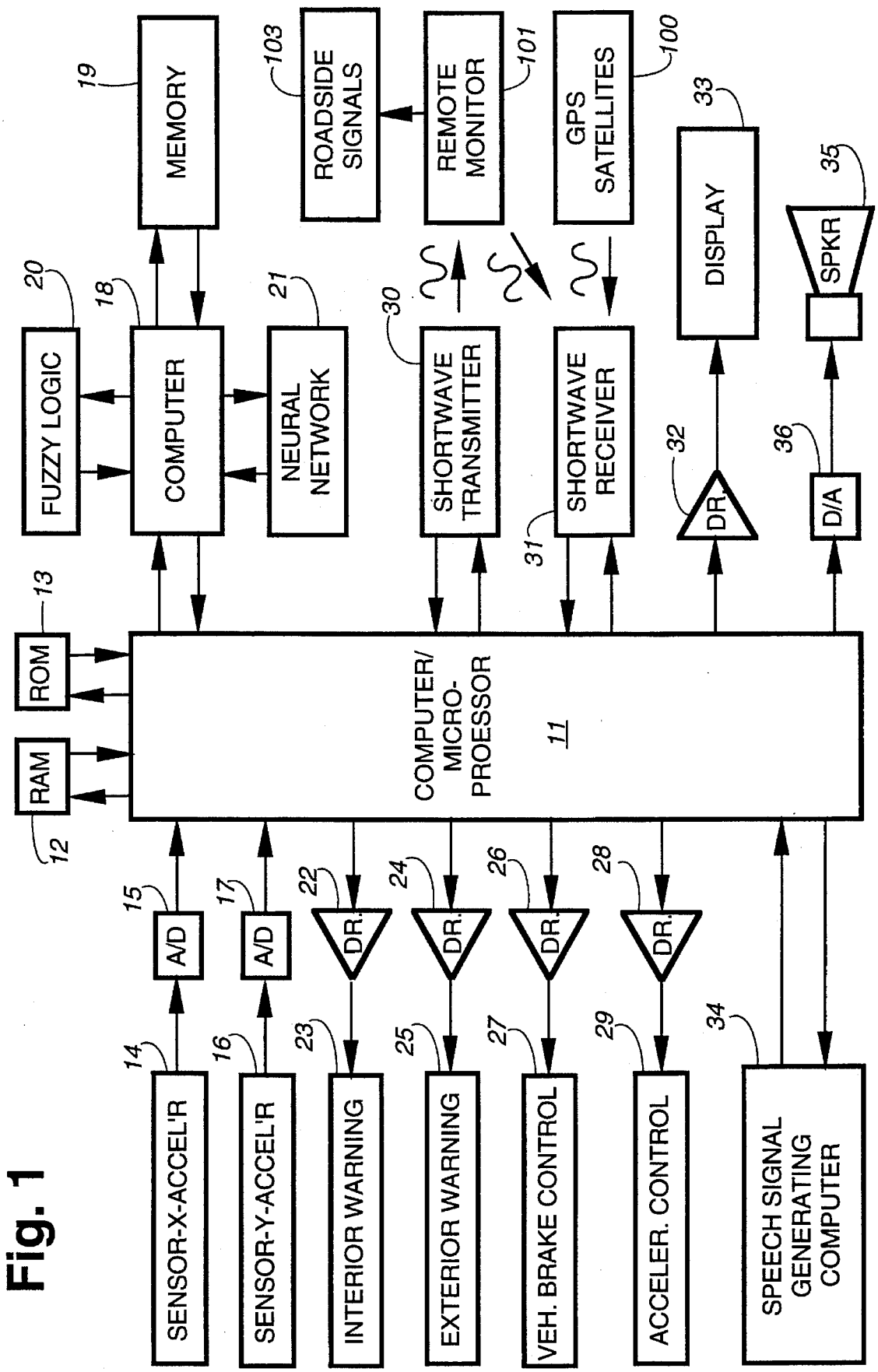
FIG. 1 is a a schematic diagram of the components of an exemplary vehicular performance monitoring system.

FIG. 1 shows the components of an exemplary system 10 for automatically monitoring the performance of a motor vehicle. The system 10 is intended to be carried by the vehicle in a suitable location and may be enclosed by a protective housing. Power for the system 10 may be provided either from a dedicated power supply or from the vehicle battery. A microprocessor 11 controls the operation of the system and communicates with various system components over a bidirectional data bus (not shown). A separate performance analyzing computer 18 together with an associated memory 19, fuzzy logic circuitry 20, and a neural network circuit 21 are provided to process data collected from sensing devices as described below and to analyze how the vehicle is being driven. Such tasks may be accomplished at least in part with software run by microprocessor 11 together with an associated RAM 12 and a ROM 13.

A sensing module comprising acceleration sensors 14 and 16 sense the instantaneous acceleration of the vehicle along two separate axes in the horizontal plane and feed the acceleration data to the microprocessor 11 through analog-to-digital converters 15 and 17, respectively. Preferably, the vehicle accelerations are sensed along orthogonal x–y axes but sensing along any two directions in the horizontal plane will suffice. From the acceleration data thus produced, microprocessor 11 computes performance variables of the vehicle such as its location, speed, and direction of travel. Coded representations of the performance variables are stored in select locations of memory 12 along with associated time and date codes generated by computer 11 for later retreival. Such acceleration data may also be augmented with signals generated from gyroscopic devices such as are commonly used in inertial navigation systems. As either a supplementary or alternative method for calculating the location of the vehicle, radio signals transmitted from the satellites 100 of a global positioning system (GPS) may be received by short wave receiver 31 which is interfaced to the system by a modem (not shown). From the satellite signals received, microprocessor 11 then computes and stores in memory the global position of the vehicle along with a time and date code.

A shortwave transmitter 30 is also interfaced to the system through a modem (not shown) for enabling two-way communications between the system 10 and a remote monitor station 101, which remote monitoring station may communicate with various roadside signaling devices 103. In one embodiment, the system 10 transmits radio signals modulated with digital information corresponding to selected stored performance variables in response to query code signals from the remote monitor station. Such query signals may, for example, specify the time and date of particular performance variables which are to be transmitted. In other embodiments, the system may be programmed to periodically transmit selected performance variables to the remote monitor station.

For communicating performance variables and other system data to a driver of the vehicle, a display 33 driven by a driver 32 and a speaker driven by a digital-to-analog converter 36 are interfaced to the system. A speech signal generating computer 34 is provided for generating select synthetic speech signals for driving speaker 35. Alternatively, such synthetic speech signals may be generated by software run by microprocessor 11.

Performance variables are continually stored in memory as they are computed along with an associated time and date code, and may be selectively accessed according to such time and date code. In addition, the system is programmed to analyze the stored performance variables over a period of time and compute an evaluation code corresponding to an assessment as to how the vehicle is being driven. Such analysis may be performed either by the microprocessor 11 or a dedicated computer 18. Evaluation codes are stored in select locations in memory along with associated time and date codes corresponding to the time interval being evaluated. Evaluation codes may define a plurality of select driving patterns including, for example, erratic or otherwise hazardous driving. Other evaluation codes may correspond to other driving patterns such as deviation from a planned course of travel. Still other evaluation codes may relate to the the vehicle itself and are computed with data fed to the system by various instruments for sensing physical variables indicating the condition of the vehicle.

When an evaluation code is computed which indicates an erratic or otherwise hazardous driving pattern or condition, the system is programmed to warn a driver of the vehicle by activating an interior warning device 23 driven by a driver 22 where such warning device may be a lamp, sound generator, or electronic display. Warnings, as well as explanatory information describing the hazardous driving pattern in detail, may also be given to the driver in the form of synthetic speech from speaker 35 or visually from display 33. An exterior warning device 25, such as a flashing light, may also be activated.

The system may also be programmed to transmit an alert signal to a remote monitor station when an evaluation code is computed which corresponds to erratic or otherwise hazardous driving. Such an alert signal may be received by traffic control authorities and may include a vehicle identification code (such as license number, make, year, color, etc.) and the vehicle's global position as currently calculated. The remote monitor station may then also activate roadside warning devices along the road where the vehicle is traveling and which instruct the driver to pull over and park at the side of the road.

Also provided are a vehicle brake controller 27 and acceleration controller 29 interfaced to the system by drivers 26 and 28, respectively. Activation of the brake and acceleration controllers can be used to prevent the vehicle from being driven at an unsafe speed or may be used to disable the vehicle from being driven. The brake and acceleration controllers may be activated by the programming of the system 10 itself when a hazardous driving pattern is detected or in response to a signal from a remote monitor station received via shortwave receiver 31. If the vehicle is stolen, for example, the vehicle may be disabled by a transmission from the remote monitor station, which transmission may also request the system 10 to transmit global position signals to the remote monitor station indicating the current location of the vehicle as well as the vehicle's identity. Theft detection equipment and circuitry of conventional design may also be interfaced to the system so that transmission of such signals occurs automatically.

Although the invention has been described in conjunction with the foregoing specific embodiment, many alternatives, variations, and modifications will be apparent to those of ordinary skill in the art. Those alternatives, variations, and modifications are intended to fall within the scope of the following appended claims.

What is claimed is:

1. A system for monitoring the performance and movements of a motor vehicle comprising:

a sensing module for sensing the vehicle's instantaneous acceleration in at least two directions and generating coded signals in accordance therewith;

a computer for computing performance variables of the vehicle from the coded signals generated by the sensing module and storing coded representations of said performance variables in select locations of a memory along with associated time and date codes;

a short wave transmitter/receiver interfaced to said computer for transmitting and receiving radio signals to and from a remote monitor station;

wherein said computer is programmed to control the transmission to a remote monitor station of radio signals modulated with digital information corresponding to the stored performance variables;

a receiver interfaced to said computer for receiving signals from a satellite global positioning system, wherein said computer is programmed to calculate the global position of the vehicle from the satellite signals and store a coded representation of same in a select memory location;

wherein said computer is programmed to analyze the stored performance variables over a period of time, compute an evaluation code corresponding to an assessment as to how the vehicle is being driven, store said evaluation code in a select location in memory, and to warn a driver of the vehicle when an evaluation code is computed which corresponds to an hazardous driving pattern; and controllers for controlling the speed of the vehicle, said controllers being activated in response to the detection of a hazardous driving pattern.

2. A system in accordance with claim 1 wherein said computer is programmed to periodically control transmission to a remote monitor station of radio signals modulated with digital information corresponding to any or all of the storm performance variables.

3. A system in accordance with claim 1 wherein said computer is programmed to control transmission to a remote monitor station of radio signals modulated with digital information corresponding to selected stored performance variables in response to query signals from the remote monitor station.

4. A system in accordance with claim 3 wherein said digital information includes a vehicle identification code and the vehicle's global position when an evaluation code is computed which corresponds to erratic or otherwise hazardous driving.

5. A system in accordance with claim 1 further comprising a synthetic speech generator interfaced to said computer for producing warning signals in the form of synthetic speech.

6. A method for monitoring the performance and movements of a motor vehicle comprising the steps of:

sensing the vehicle's instantaneous acceleration in at least two directions and generating coded signals in accordance therewith;

computing with a digital computer performance variables of the vehicle, including its position, speed, and direction, from the acceleration signals and storing coded representations of said performance variables in select locations of a memory along with associated time and date codes;

analyzing the stored performance variables over a period of time, computing an evaluation code corresponding to an assessment as to how the vehicle is being driven, and storing said evaluation code in a select location in memory;

transmitting to a remote monitor station radio signals modulated with digital information corresponding to select stored performance variables;

transmitting an alert signal to the remote monitor station and a warning signal to a driver when an evaluation code is computed which corresponds to erratic or otherwise hazardous driving; and activating one or more roadside signaling devices instructing a driver to stop the vehicle when an alert signal is transmitted to the remote monitor station.

7. A method in accordance with claim 6 wherein said radio signals modulated with digital information corresponding to select stored performance variables are periodically transmitted to a remote monitor station.

8. A method in accordance with claim 6 further comprising the step of receiving radioed query signals from a remote monitor station, and wherein radio signals modulated with digital information corresponding to select stored performance variables are transmitted in response to a query signal from the remote monitor station.

9. A method in accordance with claim 6 further comprising the steps of receiving signals from a satellite global positioning system, calculating the global position of the vehicle from the satellite signals, and storing a coded representation of same in a select memory location.

10. A method in accordance with claim 9 wherein said alert signal includes a vehicle identification code and codes indicative of the vehicle's global position when an evaluation code is computed which corresponds to erratic or otherwise hazardous driving.

11. A method in accordance with claim 6 wherein said warning signal is generated in the form of synthetic speech which describes the driving pattern.

12. A method for monitoring the performance and movements of a motor vehicle comprising the steps of:

sensing the vehicle's instantaneous acceleration in at least two directions and generating coded signals in accordance therewith;

computing with a digital computer performance variables of the vehicle, including its position, speed, and direction, from the acceleration signals and storing coded representations of said performance variables in select locations of a memory along with associated time and date codes;

analyzing the stored performance variables over a period of time, computing an evaluation code corresponding to an assessment as to how the vehicle is being driven, and storing said evaluation code in a select location in memory;

transmitting to a remote monitor station radio signals modulated with digital information corresponding to select stored performance variables;

transmitting an alert signal to the remote monitor station and a warning signal to a driver of the vehicle when an evaluation code is computed which corresponds to erratic or otherwise hazardous driving; and activating acceleration controllers in response to the detection of a hazardous driving pattern.

13. A method in accordance with claim 12 wherein said radio signals modulated with digital information corresponding to select stored performance variables are periodically transmitted to a remote monitor station.

14. A method in accordance with claim 12 further comprising the step of receiving radioed query signals from a remote monitor station, and wherein radio signals modulated with digital information corresponding to select stored performance variables are transmitted in response to a query signal from the remote monitor station.

15. A method in accordance with claim 12 further comprising the steps of receiving signals from a satellite global positioning system, calculating the global position of the vehicle from the satellite signals, and storing a coded representation of same in a select memory location.

16. A method in accordance with claim 15 wherein said alert signal includes a vehicle identification code and codes indicative of the vehicle's global position when an evaluation code is computed which corresponds to erratic or otherwise hazardous driving.

17. A method in accordance with claim 12 wherein said warning signal is generated in the form of synthetic speech which describes the driving pattern.

\* \* \* \* \*